United States Patent

Ibaraki

(10) Patent No.: US 9,910,590 B2
(45) Date of Patent: Mar. 6, 2018

(54) MOBILE TERMINAL AND METHOD FOR CONTROLLING MOBILE TERMINAL

(71) Applicant: KYOCERA Corporation, Kyoto-shi, Kyoto (JP)

(72) Inventor: Atsuko Ibaraki, Osaka (JP)

(73) Assignee: KYOCERA Corporation, Kyoto (JP)

(*) Notice: Subject to any disclaimer, the term of this patent is extended or adjusted under 35 U.S.C. 154(b) by 77 days.

(21) Appl. No.: 14/670,303

(22) Filed: Mar. 26, 2015

(65) Prior Publication Data

US 2015/0277654 A1    Oct. 1, 2015

(30) Foreign Application Priority Data

Mar. 26, 2014 (JP) ................................. 2014-064118

(51) Int. Cl.
  *G06F 3/0488* (2013.01)
  *H04N 1/00* (2006.01)

(52) U.S. Cl.
  CPC ..... *G06F 3/04886* (2013.01); *H04N 1/00408* (2013.01); *H04N 1/00411* (2013.01)

(58) Field of Classification Search
  CPC ........ G06F 3/0482; G06F 3/0488; G06F 3/14; G06F 3/041; G06F 3/048; G06F 3/0486; G06F 3/04817; H04M 1/72583; H04M 2250/22; H04M 1/72522
  See application file for complete search history.

(56) References Cited

U.S. PATENT DOCUMENTS

| | | | | |
|---|---|---|---|---|
| 6,606,103 | B1* | 8/2003 | Hamlet | G06F 9/4443 345/443 |
| 7,030,890 | B1* | 4/2006 | Jouet | G06F 9/4443 345/589 |
| 7,996,045 | B1* | 8/2011 | Bauer | G06F 3/0488 455/466 |
| 2007/0067734 | A1* | 3/2007 | Cunningham | G06F 3/04817 715/779 |
| 2008/0276170 | A1* | 11/2008 | Bonansea | G06F 1/1626 715/708 |

(Continued)

FOREIGN PATENT DOCUMENTS

| | | |
|---|---|---|
| JP | 2009-246550 A | 10/2009 |
| JP | 2013-034189 A | 2/2013 |
| JP | 2013-164778 A | 8/2013 |

OTHER PUBLICATIONS

Office Action dated May 9, 2017 issued in counterpart Japanese Application No. 2014-064118.

*Primary Examiner* — Bryan Earles
(74) *Attorney, Agent, or Firm* — Procopio Cory Hargreaves and Savitch LLP

(57) ABSTRACT

In an e-mail input mode, a control module can cause text information selected by a touch operation on a portion of a touch panel that overlaps an operation key display area of a display to be displayed in an edit display area, and can cause time information and a detected state of position information to be displayed in a first notification area. In the e-mail input mode, when a touch operation is performed on a portion of the touch panel that overlaps the first notification area, the control module can cause the time displayed in a time display area to be displayed in an editable manner, and can cause edited time to be displayed in an edit display area as text information.

10 Claims, 16 Drawing Sheets

(56) References Cited

U.S. PATENT DOCUMENTS

| | | | |
|---|---|---|---|
| 2010/0235732 A1* | 9/2010 | Bergman | G06F 3/0488 715/702 |
| 2012/0159380 A1* | 6/2012 | Kocienda | G06F 3/04883 715/783 |
| 2012/0302167 A1* | 11/2012 | Yun | G06F 3/04883 455/41.2 |
| 2013/0002580 A1 | 1/2013 | Sudou | |
| 2013/0263040 A1* | 10/2013 | Rosenberg | G06F 3/0484 715/780 |
| 2014/0304664 A1* | 10/2014 | Lee | G06F 3/0488 715/863 |
| 2015/0007075 A1* | 1/2015 | Choi | G06F 3/0488 715/769 |
| 2015/0193391 A1* | 7/2015 | Khvostichenko | G06Q 10/00 715/205 |

* cited by examiner

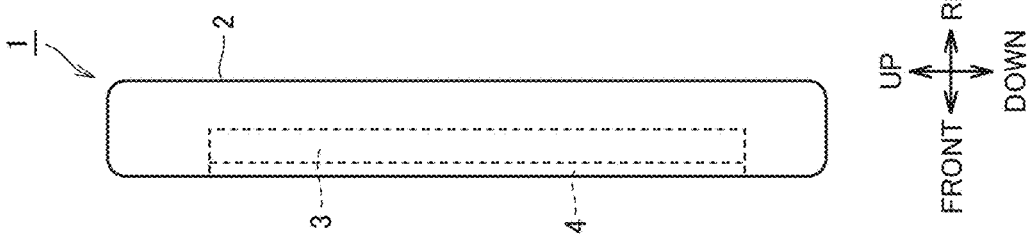
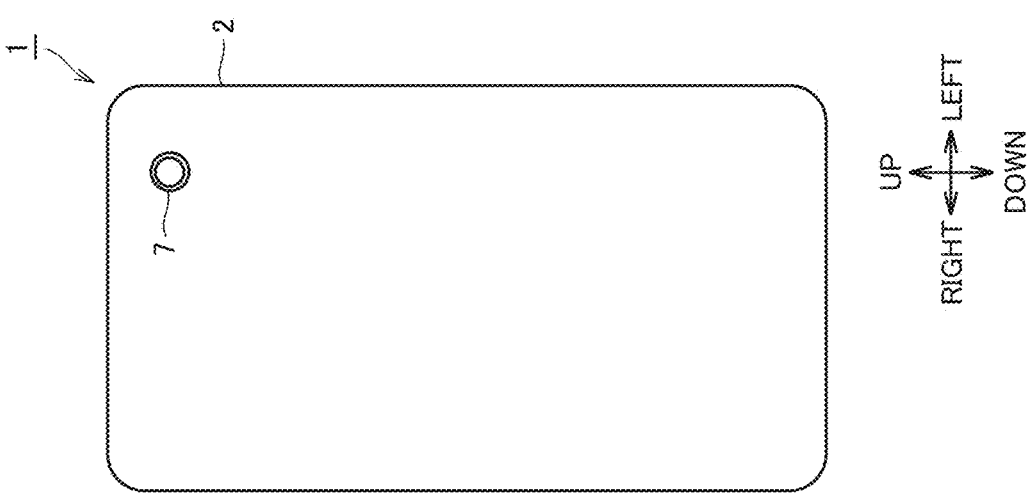
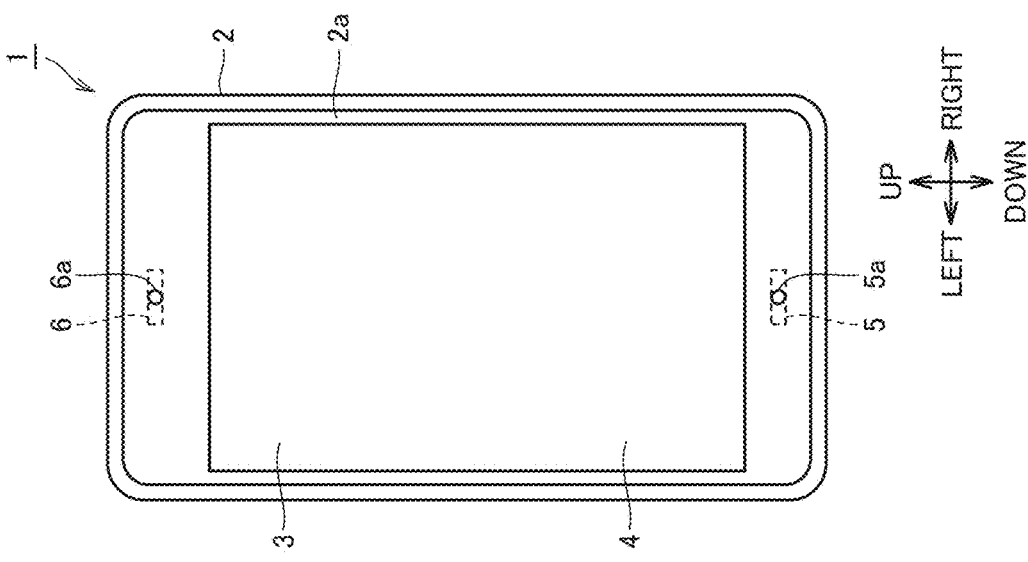

FIG.7
(A) 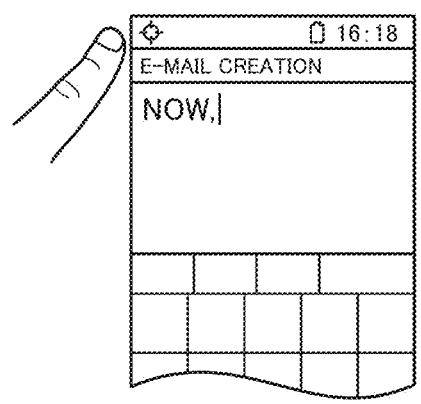  (B) 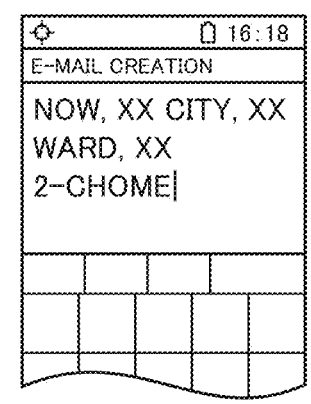
FIG.8
(A) 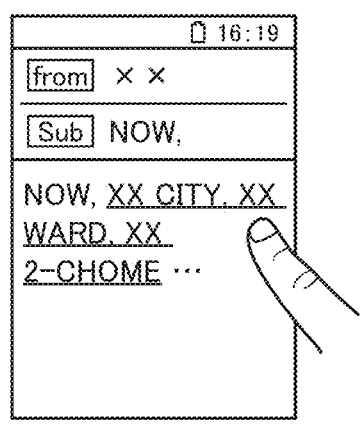  (B) 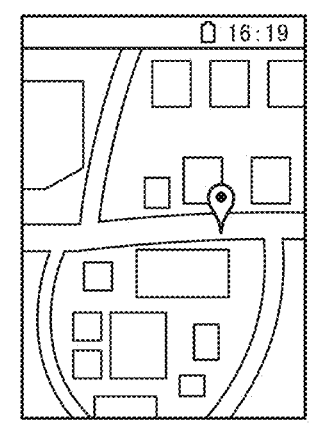

FIG.12
(A)
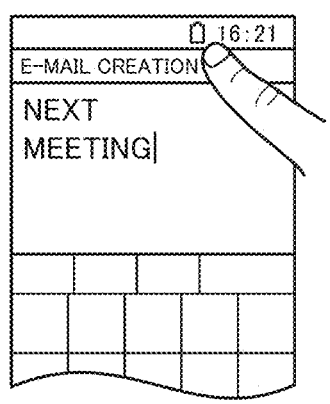
(B)
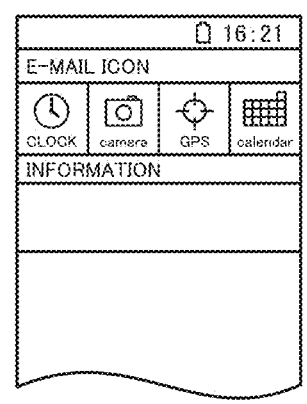

FIG.16
(A) 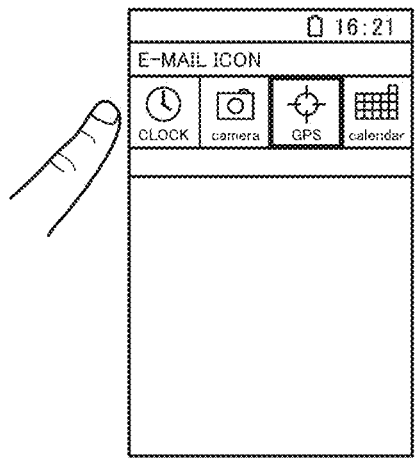 OBTAIN CURRENT LOCATION ⇨ (B) 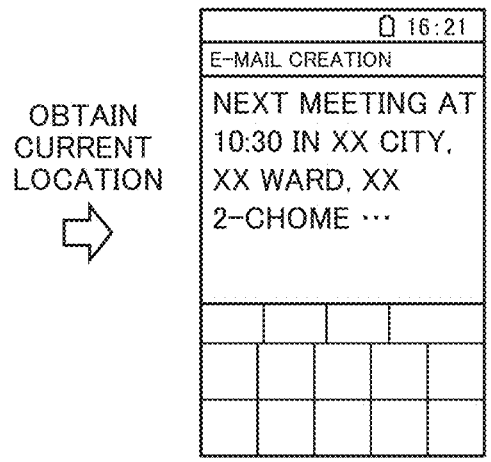

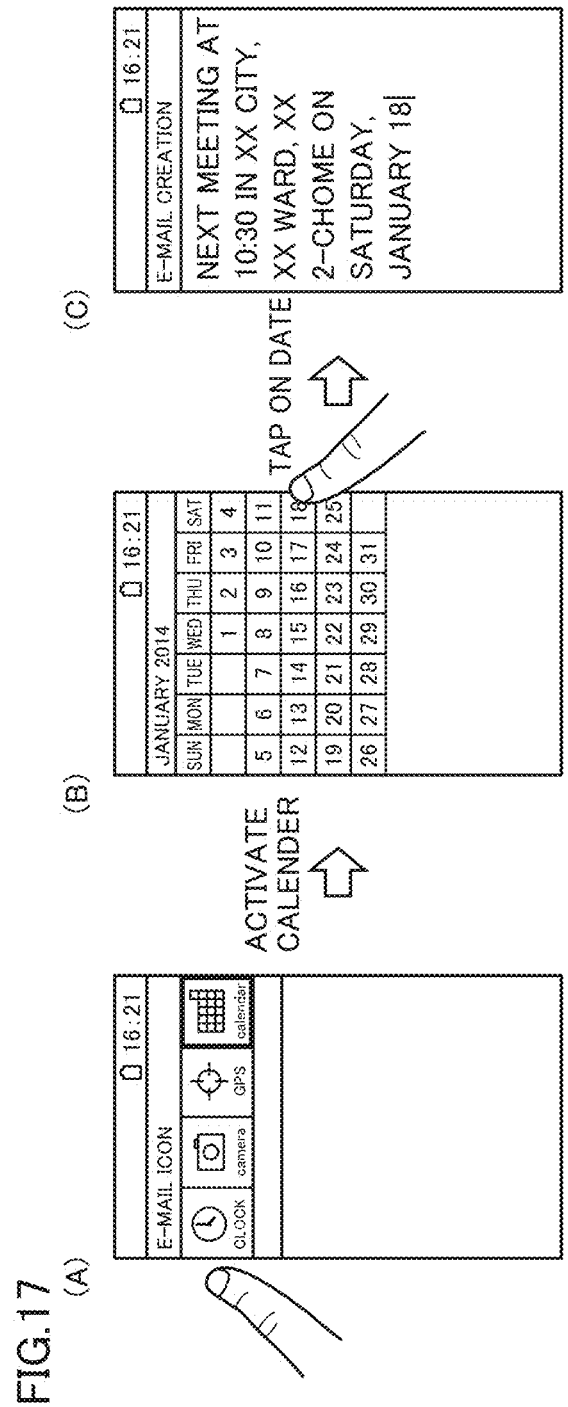

MOBILE TERMINAL AND METHOD FOR CONTROLLING MOBILE TERMINAL

CROSS-REFERENCE TO RELATED APPLICATION

The present application claims priority under 35 U.S.C. § 119 to Japanese Patent Application No. 2014-064118, filed on Mar. 26, 2014, and entitled "MOBILE TERMINAL AND METHOD FOR CONTROLLING MOBILE TERMINAL." The content of which is incorporated by reference herein in its entirety.

FIELD

An embodiment of the present disclosure relates to a mobile terminal including a touch panel, and more particularly relates to controlling a mobile terminal by which text information is easily input.

BACKGROUND

In a conventionally known mobile terminal including a touch panel, text information is input by operating the touch panel during creation of an e-mail message to be transmitted or the like.

SUMMARY

A mobile terminal according to the present disclosure includes a display module having a screen, a touch panel located to overlap the screen and configured to accept an operation by a user, and a control module configured to, in an input mode of inputting text information, control the display module to cause the text information selected by a touch operation on a portion of the touch panel that overlaps a first area in the screen to be displayed in a second area in the screen, and to cause information to be notified to the user to be displayed in a third area in the screen. When the touch operation is performed on a portion of the touch panel that overlaps the third area in the input mode, the control module is configured to cause the information displayed in the third area to be displayed in the second area as the text information as related.

A method for controlling a mobile terminal according to the present disclosure is a method for controlling a mobile terminal including a display module having a screen and a touch panel located to overlap the screen and configured to accept an operation by a user. This method for controlling includes the steps of, in an input mode of inputting text information, controlling the display module to display the text information, selected by a touch operation on a portion of the touch panel that overlaps a first area in the screen, in a second area in the screen, and to display information to be notified to the user in a third area in the screen, and when the touch operation is performed on a portion of the touch panel that overlaps the third area in the input mode, causing the information displayed in the third area to be displayed in the second area as the text information as related.

BRIEF DESCRIPTION OF THE DRAWINGS

FIGS. 1A, 1B and 1C show a front view, a rear view and a right side view of a mobile terminal, respectively.

FIG. 7 illustrates an operation for inputting position information by a touch operation on the display area indicating a detected state of position information.

FIG. 8 illustrates an operation of a terminal by an e-mail recipient.

FIG. 12 shows a configuration of a second notification area.

FIG. 16 illustrates an operation for inputting position information by a touch operation on a GPS icon.

FIG. 17 illustrates an operation for inputting date information by a touch operation on a calendar icon.

DETAILED DESCRIPTION

Figure 2:
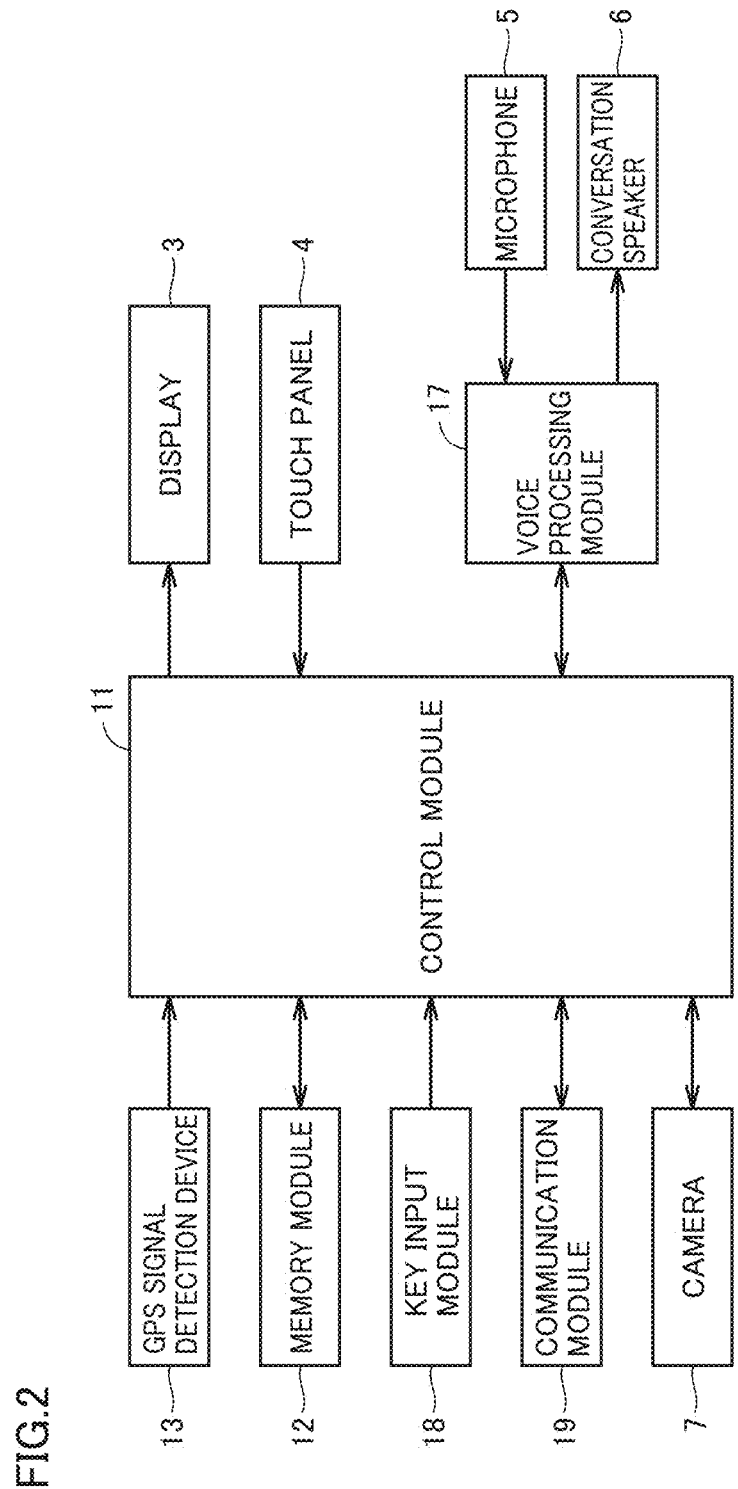
FIG. 2 is a block diagram showing an overall configuration of a mobile terminal.

Hereinafter, an embodiment of the present disclosure will be described with reference to the drawings. In the following description, the same portions have the same reference characters allotted. They also have the same names and functions. Therefore, detailed description thereof will not be repeated.

FIGS. 1A to 1C show a front view, a rear view and a right side view of a mobile terminal 1, respectively. In the following description, as shown in FIGS. 1A to 1C, the longitudinal direction of a cabinet 2 is defined as the up-down direction, and the short dimension direction of cabinet 2 is defined as the left-right direction.

In an embodiment, a cellular phone, such as a smartphone terminal, having an input interface, such as a touch panel, will be described as mobile terminal 1 as an example. Mobile terminal 1 should only be a mobile terminal at least including an application program for creating text, and may be a mobile terminal having neither a conversation function nor a communication function, for example.

As shown in FIGS. 1A to 1C, mobile terminal 1 can include cabinet 2, a display 3, a touch panel 4, a microphone 5, and a conversation speaker 6.

As shown in FIG. 1A, cabinet 2 can have a substantially rectangular outline as seen from the front surface. Display 3 can be arranged on the front surface side of cabinet 2. Various images can be displayed on a screen of display 3. Display 3 can be a LCD (Liquid Crystal Display), for example. Display 3 may be an organic EL (Electro-Luminescence) display or another type of display.

As shown in FIG. 1B, a camera 7 can be arranged on the rear surface side of cabinet 2. As shown in FIG. 1C, touch panel 4 can be located to overlap the front surface of display 3. Therefore, display 3 can be covered with touch panel 4. Touch panel 4 can be formed as a transparent sheet. Touch panel 4 may be implemented by any of various types of touch panels, such as capacitance, ultrasonic, pressure-sensitive, resistance film, and optical detection touch panels.

In the inside of cabinet 2, microphone 5 can be arranged at the lower end. In the inside of cabinet 2, conversation speaker 6 can also be arranged at the upper end. Microphone 5 can receive voice passed through a microphone hole 5a formed in the front surface of cabinet 2. Microphone 5 can generate an electrical signal in accordance with received sound. Conversation speaker 6 can output sound. The output sound can pass through an output hole 6a formed in the front surface of cabinet 2, and can be emitted to the outside of cabinet 2. During a conversation, incoming voice received from a device (cellular phone etc.) of a communication partner can be output through conversation speaker 6, and outgoing voice emitted by a user can be input to microphone 5. Sound can include various sounds, such as voice and an alarming sound.

FIG. 2 is a block diagram showing an overall configuration of mobile terminal 1. As shown in FIG. 2, mobile terminal 1 can further include a control module 11, a memory module 12, a GPS (Global Positioning System) signal detection device 13, a voice processing module 17, a key input module 18, and a communication module 19.

Memory module 12 can include a ROM (Read Only Memory), a RAM (Random Access Memory), and an external memory. Memory module 12 can store various programs. The programs stored in memory module 12 can include various applications (e.g., home, telephone, e-mail, web browser, map, game, and schedule management applications) in addition to a control program for controlling each module of mobile terminal 1. The programs can be stored in memory module 12 by a manufacturer during manufacture of mobile terminal 1, or can be stored in memory module 12 via a communication network or a storage medium, such as a memory card or a CD-ROM.

Memory module 12 can also include a working area temporarily storing data used or generated during execution of a program.

Control module 11 can include a CPU (Central Processing Unit). Control module 11 can control each module (display 3, memory module 12, voice processing module 17, communication module 19, etc.) constituting mobile terminal 1 in accordance with a program stored in memory module 12.

Control module 11 can output a display control signal to display 3 to cause an image to be displayed on the screen of display 3. Control module 11 can also output a camera control signal to camera 7 to control camera 7, and can cause memory module 12 to store image data obtained from camera 7.

Touch panel 4 can detect a touch operation on touch panel 4 made by a user, and can output a detection result to control module 11. Specifically, touch panel 4 can detect a position on touch panel 4 the user has touched (hereinafter referred to as a "touch position"). Touch panel 4 can output a position signal indicating the detected touch position to control module 11 as a detection result.

A user can perform various touch operations using touch panel 4. For example, touch operations can include a tap operation, a flick operation, a sliding operation, and the like.

In a tap operation, a user touches touch panel 4 with his/her finger, and then releases his/her finger from touch panel 4 after a short time. In a flick operation, a user touches touch panel 4 with his/her finger, and then flips touch panel 4 with his/her finger in any direction. In a sliding operation, a user moves his/her finger in any direction while touching touch panel 4 with his/her finger. Control module 11 can specify what touch operation has been performed based on a changing mode of the position signal from touch panel 4.

For example, if a touch position is no longer detected within a predetermined first time period after detection of the touch position, control module 11 can determine that a tap operation has been performed. For example, if a touch position is moved by a predetermined first distance or more within a predetermined second time period after detection of the touch position, and then the touch position is no longer detected, control module 11 can determine that a flick operation has been performed. If a touch position is moved by a predetermined second distance or more after detection of the touch position, and then detection of the touch position is continued, control module 11 can determine that a sliding operation has been performed.

GPS signal detection device 13 can receive (detect) electric waves (GPS signal) from a GPS satellite, and can output the received GPS signal to control module 11. Control module 11 can calculate the current position of mobile terminal 1 based on the GPS signal. Control module 11 may calculate the current position of mobile terminal 1 based on position information from one or more surrounding base stations, in addition to the GPS signal.

When sound, such as voice, is input to microphone 5, an electrical signal indicating the input sound received through microphone 5 can be output to voice processing module 17. Conversation speaker 6 can output sound, such as voice, based on the electrical signal received from voice processing module 17.

Voice processing module 17 can perform A/D conversion or the like on the electrical signal from microphone 5, and can output a digital voice signal after conversion to control module 11. Voice processing module 17 can perform a decoding process, D/A conversion and the like on the digital voice signal from control module 11, and can output an electrical signal after conversion to conversation speaker 6.

Key input module 18 can include at least one or more hard keys. For example, key input module 18 can include a power key for turning on mobile terminal 1. Key input module 18 can output a signal corresponding to a pressed hard key to control module 11.

Communication module 19 can include a circuit for converting a signal, an antenna for transmitting/receiving electric waves, and the like in order to carry out conversations and/or communications. Communication module 19 can convert a signal for a conversation or a communication received from control module 11 into a radio signal, and can transmit the converted radio signal to a communication partner, such as a base station or another communication device, via the antenna. Furthermore, communication module 19 can convert the radio signal received via the antenna into a signal in a format that can be used by control module 11, and can output the converted signal to control module 11.

In mobile terminal 1 having the configuration as described above, a user may create an e-mail message to be transmitted during activation of an application program for performing e-mail transmission/reception (hereinafter referred to as an e-mail application), for example.

In this case, the user can select text information by a touch operation on a predetermined area (hereinafter referred to as a first area) of touch panel 4. Control module 11 can specify text information selected by the user based on the detection result of the touch position by touch panel 4, and can cause the selected text information to be displayed in a predetermined area (hereinafter referred to as a second area) in the screen of display 3.

For example, text information can include various characters, such as the alphabet, hiragana and katakana (Japanese syllabaries), various symbols, various numbers, various characters used in other languages, pictographs, emoticons, and the like.

Figure 3:
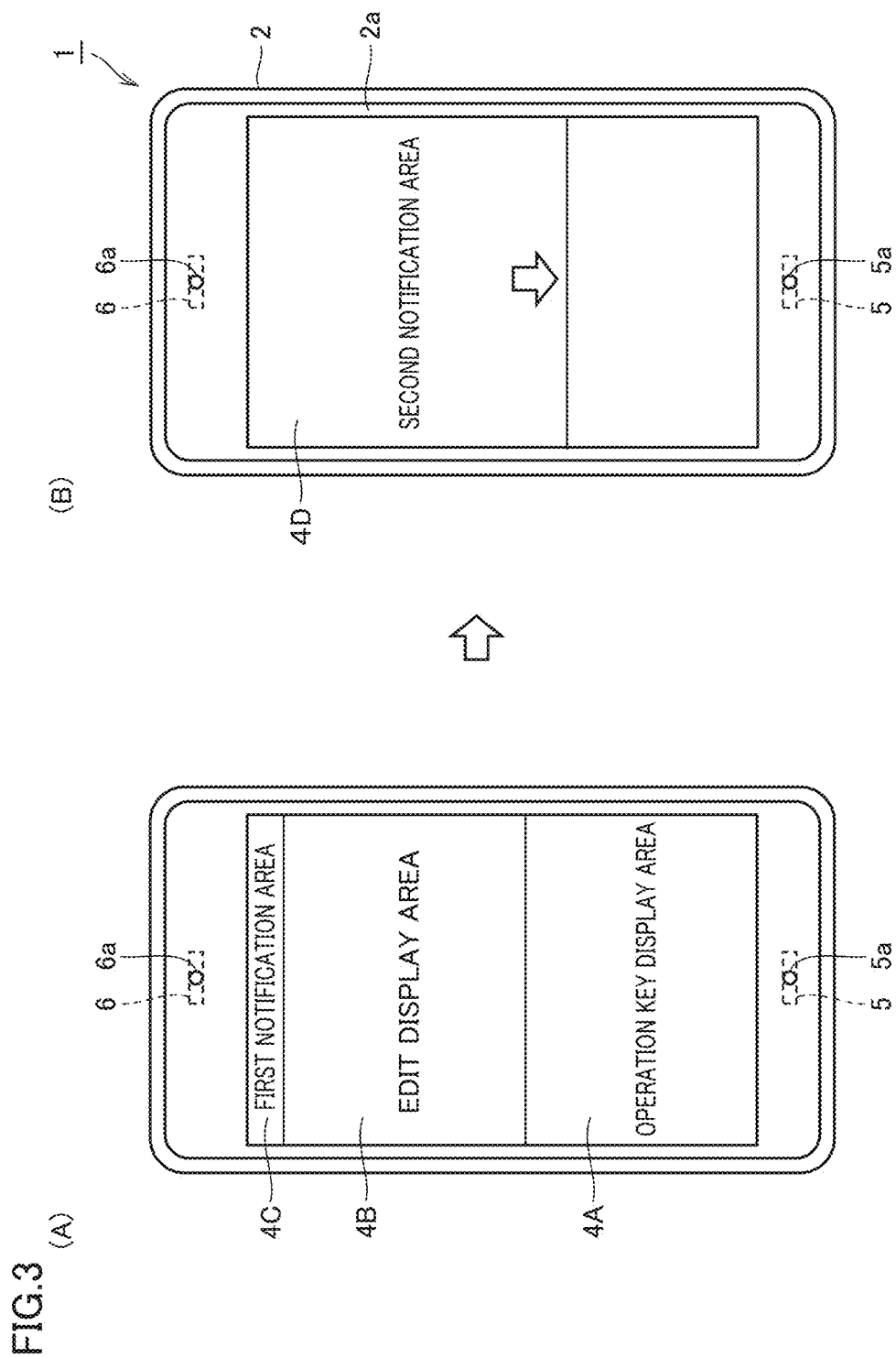
FIG. 3 shows an example of a configuration of a screen in an input mode of inputting text information.

As a configuration of the screen of mobile terminal 1 in an input mode of inputting text information, a rectangular operation key display area 4A can be located at the lower part of the screen, and a rectangular edit display area 4B can be located above operation key display area 4A at a different position from operation key display area 4A, as shown in FIG. 3(A), for example. A band-like first notification area 4C can be located at the topmost part of the screen.

Even in the input mode, when a user performs a predetermined operation on touch panel 4, a second notification area 4D can be displayed as shown in FIG. 3(B). When a predetermined operation is performed, control module 11 can cause second notification area 4D to be displayed overwriting operation key display area 4A and edit display area 4B partially or entirely.

The predetermined operation can be a flick operation starting from a predetermined position (e.g., an upper part of touch panel 4) in a predetermined direction (e.g., downward), for example. The predetermined position may be located at a lower part of touch panel 4, or may be located on a lateral side, or may be located in the vicinity of the center of touch panel 4. The predetermined direction may be directed toward the center of touch panel 4 if the predetermined position is located in the vicinity of the outer edge of touch panel 4, or may be directed from the vicinity of the center toward the outer edge if the predetermined position is located in the vicinity of the center of touch panel 4. The predetermined operation is not limited to a touch operation, but may be an operation on hard keys, such as buttons, for example.

In the operation key display area of the screen, for example, images of a plurality of operation keys may be displayed in an arrangement similar to that of a keyboard, or images of a plurality of operation keys may be displayed in an arrangement similar to that of hard keys of a cellular phone for selecting text information. Each image of the plurality of operation keys can be associated with one or more types of characters. Therefore, when the touch position detected by touch panel 4 is a position of any of the images of the plurality of operation keys, control module 11 can specify a character associated with the image of an operation key corresponding to the touch position, as a selected character. When a plurality of types of characters are associated with the image of one operation key, control module 11 can specify a selected character by the number of times that a user performs a tap operation on the image of that operation key, the direction when a sliding operation or a flick operation starting from the display position of the image of that key is performed, or the like. The plurality of operation keys can include, for example, a selection key for selecting any mode from among an input mode of inputting the alphabet, an input mode of inputting hiragana, an input mode of inputting katakana, and an input mode of inputting signs and/or numbers. When a touch position is located at the image of the selected key, control module 11 can select any one of the above-described plurality of input modes.

Text information selected by a user by a touch operation on the operation key display area can be displayed in edit display area 4B. Accordingly, the user can recognize the details of text in an e-mail message to be transmitted being created.

In first notification area 4C and second notification area 4D, at least one of time information, a detected state of position information, weather information, and date information can be displayed. Description will be made assuming that time information and the detected state of position information are displayed in first notification area 4C in an embodiment. Description will also be made assuming that at least weather information and date information are displayed in second notification area 4D.

The time information can indicate the current time, for example. For example, time information may be displayed in a display format similar to that of a digital clock, or may be displayed in a display format similar to that of an analog clock. For example, control module 11 can clock with a built-in timer or the like, and can update the time displayed in a predetermined area (hereinafter referred to as a time display area) of first notification area 4C at a predetermined time interval (e.g., every 1 minute).

The detected state of position information can refer to a state in which a GPS icon of a predetermined shape is displayed when GPS signal detection device 13 is operating, and in which the GPS icon is hidden when GPS signal detection device 13 is not operating. When obtaining position information using GPS, for example, control module 11 can cause the GPS icon to be displayed in a predetermined area (hereinafter referred to as a detected state display area) of first notification area 4C.

The weather information can include a weather report and probability of precipitation, for example. For example, the weather information can indicate a weather report by an image showing the sun, cloud or umbrella, and can indicate the probability of precipitation in percentage. For example, control module 11 can obtain weather information of the current location or a district registered by a user, received from an external instrument (server) of mobile terminal 1 via communication module 19, every time a predetermined period has elapsed, and can cause memory module 12 to store the obtained weather information. When causing hidden second notification area 4D to be displayed by a user's predetermined operation, control module 11 can read the weather information stored in memory module 12 for display in a predetermined area (hereinafter referred to as a weather display area) of second notification area 4D.

The date information can indicate the current month and date, for example. For example, the date information can be displayed in a display format similar to that of a calendar, with the display mode of numbers corresponding to the current month and date (boldface, background color, etc.) changed. When causing hidden second notification area 4D to be displayed by a user's predetermined operation, control module 11 can cause the date information to be displayed in a predetermined area (hereinafter referred to as a date display area) of second notification area 4D in a display format similar to that of the calendar.

In mobile terminal 1 having such a configuration, a character string in which numbers and kanji (Chinese characters used in Japan) are combined, such as a time expressed as "xx (ji) xx (hun)" (which means xx (hour) xx (minute) in English) or a date expressed as "xx (gatsu) xx (nichi)" (which means xx (month) xx (date) in English), may be input as text information in the input mode, for example. On this occasion, the operation on mobile terminal 1 may become complicated since the type of text information to be input may be switched between input of numbers and input of kanji.

Therefore, an embodiment is characterized in that when a touch operation is performed on a portion of touch panel 4 that overlaps first notification area 4C or second notification area 4D in the text information input mode, control module 11 can cause information displayed in first notification area 4C or second notification area 4D to be reported to a user (information relevant to at least any one of time information, position information, weather information, and date information) to be displayed in edit display area 4B as related text information.

Specifically, when a touch operation is performed on a portion of touch panel 4 that overlaps the time display area in the input mode, control module 11 can cause the time information to be displayed in an editable manner, and can cause edited time information to be displayed in edit display area 4B as text information.

When a touch operation is performed on a portion of touch panel 4 that overlaps the detected state display area in the input mode, control module 11 can cause the address of the current location detected by GPS signal detection device 13 to be displayed in edit display area 4B as text information.

When a touch operation is performed on a portion of touch panel 4 that overlaps the weather display area in the input mode, control module 11 can cause the weather information to be displayed in edit display area 4B as text information.

When a touch operation is performed on a portion of touch panel 4 that overlaps the date display area in the input mode, control module 11 can cause the date corresponding to the touch position to be displayed in edit display area 4B as text information.

Figure 4:
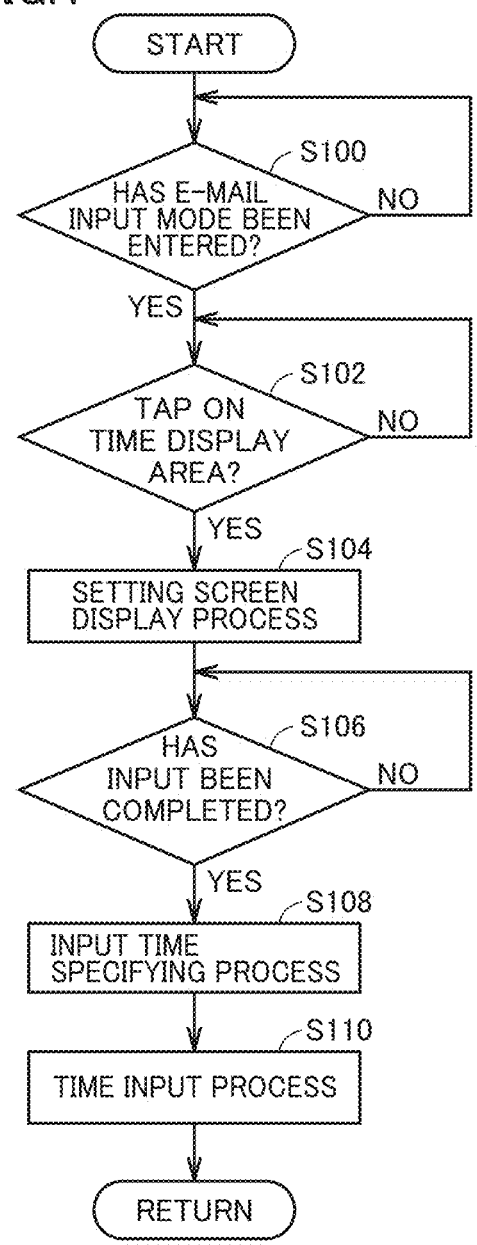
FIG. 4 is a flow chart showing a control process for inputting time by a touch operation on a time display area.

Referring to FIG. 4, a control process, executed by control module 11 of mobile terminal 1 according to an embodiment, for causing time information to be displayed in edit display area 4B by a touch operation on the time display area will be described.

In step (hereinafter, step will be abbreviated to S) 100, control module 11 can determine whether or not an input mode of an e-mail application (hereinafter referred to as an e-mail input mode) has been entered. When a touch operation for creating an e-mail message to be transmitted is performed to obtain a screen configuration including the operation key display area and edit display area 4B shown in FIG. 3(A), for example, control module 11 can bring a flag corresponding to the e-mail input mode into an ON state. When the flag is in the ON state, control module 11 can determine that the e-mail input mode has been entered. When it is determined that the e-mail input mode has been entered (YES in S100), the process proceeds to S102. Otherwise (NO in S100), the process is returned to S100.

In S102, control module 11 can determine whether or not a tap operation has been performed on the time display area. When a tap operation has been performed on the time display area (YES in S102), the process proceeds to S104. Otherwise (NO in S102), the process is returned to S102.

In S104, control module 11 can cause time information to be displayed in an editable manner, and can execute a setting screen display process for accepting a user operation. On this occasion, control module 11 can cause a time setting image to be displayed at a position overlapping part of the operation key display area and edit display area 4B.

Figure 5:
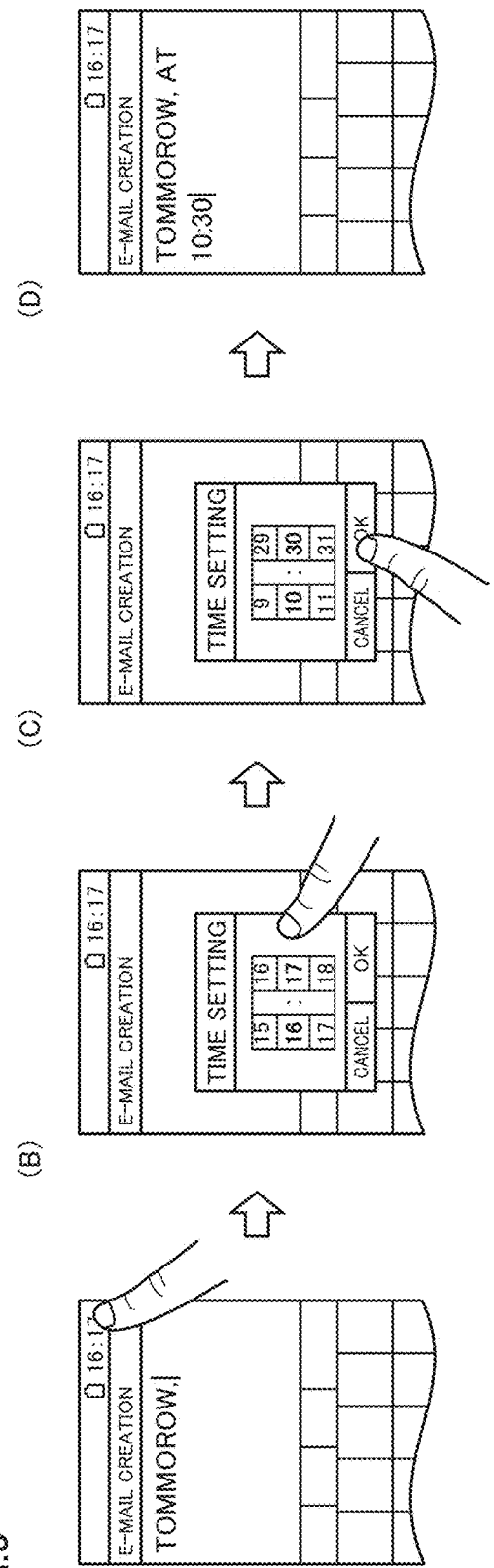
FIG. 5 illustrates an operation for inputting time by a touch operation on the time display area.

In the time setting image, in a rectangular frame, an image representing three consecutive numbers corresponding to "xx (ji)" can be arranged in the longitudinal direction on the left-hand side with respect to ":" and an image representing three consecutive numbers corresponding to "xx (hun)" can be arranged in the longitudinal direction on the right-hand side (see FIG. 5(B)).

For example, when a user performs a touch operation (e.g., a sliding operation or a flick operation) on an image representing the number corresponding to "xx (ji)", images representing three numbers can be moved in a direction corresponding to the motion of a user's finger, and the combination of three numbers displayed can be changed.

For example, assume the state in which numbers "15", "16" and "17" are arranged in the order presented as the numbers corresponding to "xx (ji)." On this occasion, assume the case in which a user performs a sliding operation or a flick operation downward within the display area of the images showing these numbers. In this case, respective images of "15", "16" and "17" can be moved downward, then the image of "17" can be deleted, and an image of "14" can newly appear above the image of "15". The combination of images representing three numbers displayed in the display area can thereby be changed.

During the movement of the numbers, control module 11 can cause an image of part of the images of "14" and "17" in the rectangular frame to be drawn, and can cause an image of part of the images of "14" and "17" outside the rectangular frame to be deleted.

When a user performs a sliding operation or a flick operation upward within the display area showing three numbers, respective images of "15", "16" and "17" can be moved upward. Thereafter, the image of "15" can be deleted, and the image of "18" can newly appear below the image of "17". In this manner, the combination of images representing three numbers displayed in the display area can be changed.

Control module 11 can cause three consecutive numbers among a plurality of numbers "1" to "24" corresponding to "xx (ji)" to be arranged in the longitudinal direction, can change the combination of three numbers in response to a user's sliding operation or flick operation and can cause the combination to be displayed. The plurality of numbers corresponding to "xx (ji)" may be "1" to "12".

Similarly, control module 11 can cause three consecutive numbers among a plurality of numbers "00" to "59" corresponding to "xx (hun)" to be arranged in the longitudinal direction, can change the combination of three numbers in response to a user's sliding operation or flick operation and can cause the combination to be displayed.

The plurality of numbers corresponding to "xx (hun)" may be numbers in 5-minute increments or in 10-minute increments, instead of 1-minute increments.

On the time setting image configured in this way, a user can perform a sliding operation or a flick operation described above such that the number at the center in the longitudinal direction among the display positions of three numbers corresponding to "xx (ji)" displayed within the rectangular frame becomes a desired number.

Similarly, a user can perform a sliding operation or a flick operation described above such that the number at the center in the longitudinal direction among the display positions of three numbers corresponding to "xx (hun)" displayed within the rectangular frame becomes a desired number.

In S106, control module 11 can determine whether or not input of time has been completed. For example, when a tap operation has been performed on a display area of an image including a character string of "OK" (see FIG. 5(B)) in the above-described time setting image, control module 11 can determine that input of time has been completed. When it is determined that input of time has been completed (YES in S106), the process proceeds to S108. Otherwise (NO in S106), the process is returned to S106.

In S108, control module 11 can execute an input time specifying process. Specifically, control module 11 can specify the number at the center in the longitudinal direction among the images representing three numbers corresponding to "xx (ji)" at the time when it is determined that input of time has been completed and the number at the center in the longitudinal direction among the images representing three numbers corresponding to "xx (hun)" at that time. Control module 11 can specify the time selected by the user from the specified numbers.

For example, when the number at the center in the longitudinal direction corresponding to "xx (ji)" is "10" and the number at the center in the longitudinal direction corresponding to "xx (hun)" is "30", the time selected by the user is specified as "10:30".

In S110, control module 11 can execute a time input process. Specifically, control module 11 can cause the time specified in the input time specifying process to be displayed in edit display area 4B in a predetermined format. The predetermined format is described herein as a format of "xx (ji) xx (hun)", for example, but time information to be displayed in edit display area 4B may be in a format including the month, date and year in addition to the hour and minute.

An operation for inputting the time by a touch operation on the time display area based on the control process described above will be described with reference to FIG. 5.

For example, assume the case in which a user creates an e-mail message to be transmitted (YES in S100). When the user performs a tap operation on the time display area of first notification area 4C as shown in FIG. 5(A) (YES in S102), a time setting image can be displayed as shown in FIG. 5(B).

Assume that the user has selected "10", for example, as the number corresponding to "xx (ji)" by performing a sliding operation or a flick operation in the display area of three numbers corresponding to "xx (ji)" in the rectangular frame of the time setting image.

Also assume that the user has selected "30" as the number corresponding to "xx (hun)" by performing a sliding operation or a flick operation in the display area of three numbers corresponding to "xx (hun)" in the rectangular frame of the time setting image.

As shown in FIG. 5(C), when the user performs a tap operation on the image representing the character string of "OK", it can be determined that input of time has been completed (YES in S106), and the numbers at the center in the longitudinal direction corresponding to "xx (ji)" and "xx (hun)", respectively, can be specified. The time can be specified by the specified numbers (S108). Then, as shown in FIG. 5(D), the specified time "10:30" is displayed in edit display area 4B as text information (S110).

Figure 6:
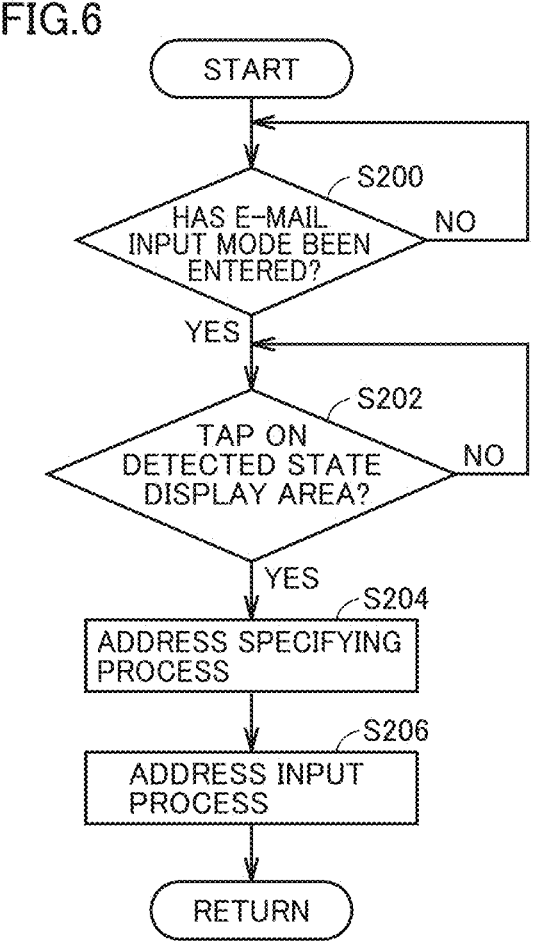
FIG. 6 is a flow chart showing a control process for inputting position information by a touch operation on a display area indicating a detected state of position information.

Referring to FIG. 6, a control process, executed by control module 11 of mobile terminal 1 according to an embodiment, for causing position information to be displayed in edit display area 4B as text information by a touch operation on the detected state display area will now be described.

In S200, control module 11 can determine whether or not the e-mail input mode has been entered. When it is determined that the e-mail input mode has been entered (YES in S200), the process proceeds to S202. Otherwise (NO in S200), the process is returned to S200.

In S202, control module 11 can determine whether or not a tap operation has been performed on the display area of a GPS icon. When a tap operation has been performed on the display area of the GPS icon (YES in S202), the process proceeds to S204. Otherwise (NO in S202), the process is returned to S202.

In S204, control module 11 can execute an address specifying process. Specifically, control module 11 can obtain information indicating the current location of mobile terminal 1 by receiving a GPS signal. The information indicating the current location may be based on the latitude or longitude, for example. Control module 11 may specify the address of the current location from the information indicating the current location and information stored in the memory or the like, or may specify the address of the current location by transmitting information indicating the current location to an external server of mobile terminal 1 and receiving information indicating the address corresponding to the information indicating the current location.

In S206, control module 11 can execute an address input process. Specifically, control module 11 can cause the specified address of the current location to be displayed in edit display area 4B as text information in a predetermined format.

The predetermined format can include at least any one of the prefecture, city, ward, town, village, and house number, for example. During execution of the address input process, control module 11 can add link information between the specified address and an application program for displaying a map on the screen (hereinafter referred to as a map application). The link information can be information for causing a position corresponding to the specified address to be displayed on a map of the map application.

An operation for inputting an address by a touch operation on the detected state display area based on the above-described control process will be described with reference to FIG. 7.

For example, assume the case in which a user creates an e-mail message to be transmitted (YES in S200). As shown in FIG. 7(A), when the user performs a tap operation on the detected state display area of first notification area 4C (YES in S202), the address indicating the current location of mobile terminal 1 can be specified based on a GPS signal (S204). Then, as shown in FIG. 7(B), the specified address of the current location can be displayed in edit display area 4B as text information.

The text information can include link information between the specified address and the map application. Therefore, when a recipient having received an e-mail message including the text information performs a tap operation on the address included in the received e-mail message as shown in FIG. 8(A), the map application can be activated as shown in FIG. 8(B), and the position corresponding to the address included in the received e-mail message can be displayed on the map.

Figure 9:
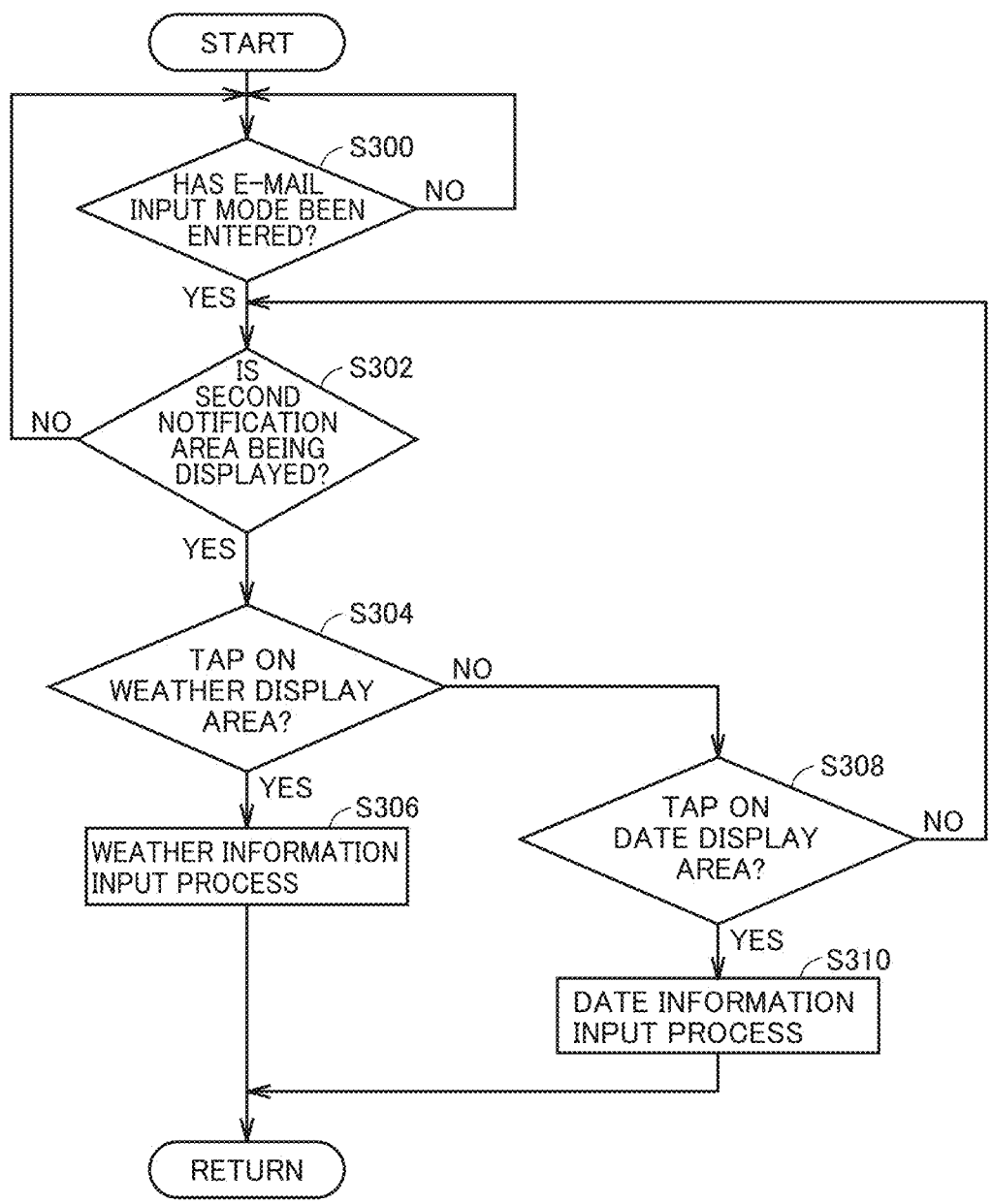
FIG. 9 is a flow chart showing a control process for inputting weather information or date information by a touch operation on a weather display area or a date display area.

Referring to FIG. 9, a control process, executed by control module 11 of mobile terminal 1 according to an embodiment, for causing weather information or date information to be displayed in edit display area 4B as text information by a touch operation on the weather display area or date display area of second notification area 4D will now be described.

In S300, control module 11 can determine whether or not the e-mail input mode has been entered. When the e-mail input mode has been entered (YES in S300), the process proceeds to S302. Otherwise (NO in S300), the process is returned to S300.

In S302, control module 11 can determine whether or not second notification area 4D is being displayed. When second notification area 4D is displayed as shown in FIG. 3(B) by a user performing a downward flick operation on an upper part of the screen with operation key display area 4A, edit display area 4B and first notification area 4C being displayed as shown in FIG. 3(A), control module 11 can bring a flag into an ON state. Control module 11 can determine that second notification area 4D is being displayed when the flag is in the ON state. When second notification area 4D is being displayed (YES in S302), the process proceeds to S304. Otherwise (NO in S302), the process is returned to S302.

In S304, control module 11 can determine whether or not a tap operation has been performed on the weather display area. When a tap operation has been performed on the weather display area (YES in S304), the process proceeds to S306. Otherwise (NO in S304), the process proceeds to S308.

In S306, control module 11 can execute a weather information input process. Specifically, control module 11 can cause weather information to be displayed in edit display area 4B in a predetermined format.

The predetermined format can include a section indicating a weather report (e.g., "cloudy, followed by rain") and a section indicating the probability of precipitation (e.g., "80%"), for example. In addition to these pieces of information, the predetermined format may include the name of a place for which the forecast is made.

In S308, control module 11 can determine whether or not a tap operation has been performed on the date display area. When a tap operation has been performed on the date display area (YES in S308), the process proceeds to S310. Otherwise (NO in S308), the process is returned to S302.

In S310, control module 11 can execute a date information input process. Specifically, control module 11 can specify the date corresponding to a tap position, and can cause the specified date to be displayed in edit display area 4B as text information in a predetermined format. The predetermined format can include "xx (gatsu) xx (nichi) ( . . . )" in which information on the day of the week has been added to the month and date, for example. In addition to these pieces of information, the predetermined format may include the year or the like.

Figure 10:
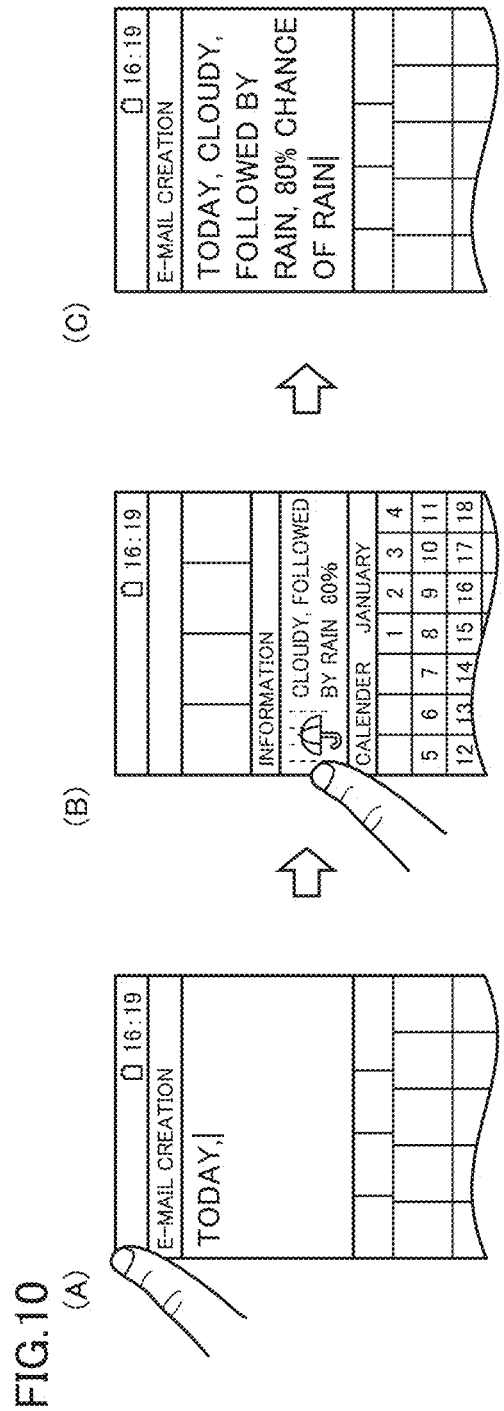
FIG. 10 illustrates an operation for inputting weather information by a touch operation on the weather display area.
Figure 11:
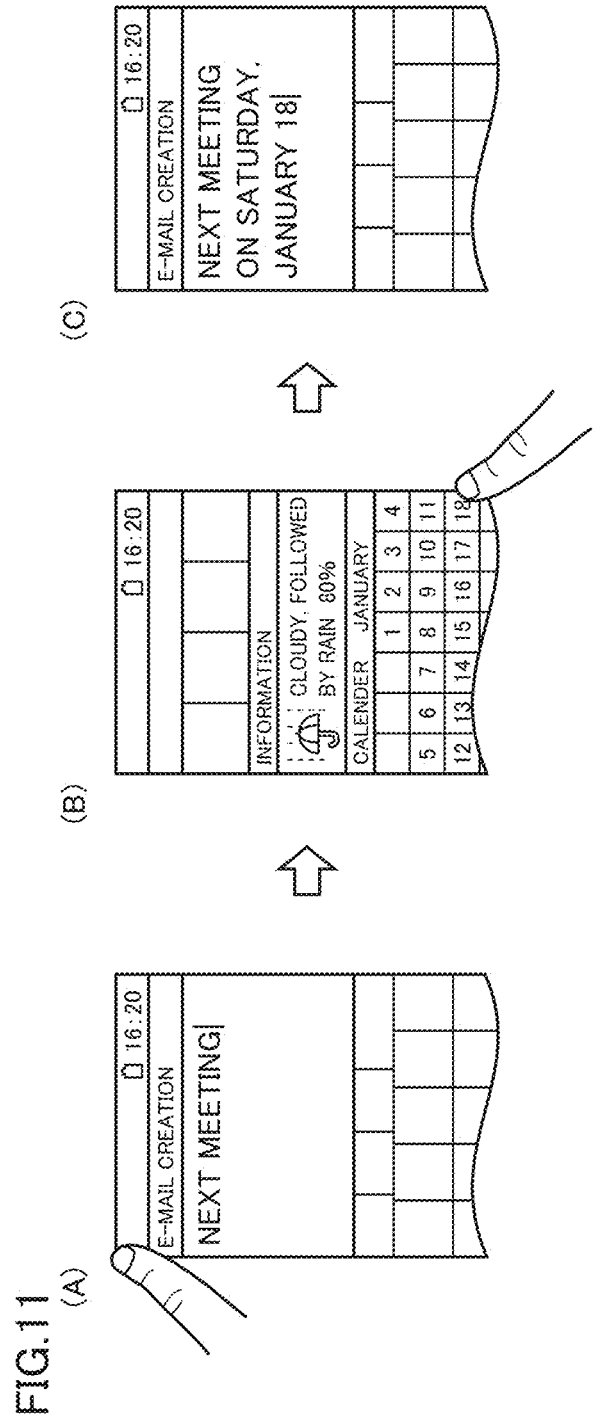
FIG. 11 illustrates an operation for inputting date information by a touch operation on the date display area.

An operation for inputting weather information or date information by a touch operation on the weather display area or date display area based on the above-described control process will be described with reference to FIGS. 10 and 11.

For example, assume the case in which a user creates an e-mail message to be transmitted (YES in S300). As shown in FIG. 10(A), when a user performs a downward flick operation on the upper part of the screen, second notification area 4D can be displayed (YES in S302).

When the user performs a tap operation on the weather display area in second notification area 4D as shown in FIG. 10(B) (YES in S304), the weather information input process can be executed (S306). By the weather information input process, weather information can be displayed in edit display area 4B as text information in a predetermined format, as shown in FIG. 10(C).

On the other hand, as shown in FIG. 11(A), when a user performs a downward flick operation on the upper part of the screen, second notification area 4D can be displayed (YES in S302). Then, when a tap operation is performed on the date display area in second notification area 4D as shown in FIG. 11(B) (NO in S304 and YES in S308), the date information input process can be executed (S310). By the date information input process, date information can be displayed in edit display area 4B as text information in a predetermined format, as shown in FIG. 11(C).

As described above, with mobile terminal 1 according to an embodiment, at least any one of time information, position information, weather information, and date information can be displayed in edit display area 4B as text information by a touch operation on first notification area 4C or second notification area 4D. Therefore, a character string can be input by a simpler operation than when performing a touch operation on operation key display area 4A to cause information to be displayed in edit display area 4B as text information. Therefore, a mobile terminal in which a character string can be input by a simple operation and a method for controlling a mobile terminal can be provided.

More specifically, since time information can be displayed in an editable manner by performing a touch operation on the time display area of first notification area 4C, and edited time information can be displayed in edit display area 4B as text information, it is unnecessary for a user to input a desired time while changing the input mode between numbers and kanji. Therefore, a character string indicating the time can be input by a simple operation.

Similarly, since the address of the current location detected by GPS signal detection device 13 can be displayed in edit display area 4B as text information by performing a touch operation on the detected state display area of first notification area 4C, it is unnecessary for a user to input the address of the current location by a touch operation on operation key display area 4A. Therefore, a character string indicating the address can be input by a simple operation.

Furthermore, since weather information or date information can be displayed in edit display area 4B by performing a touch operation on the weather display area or date display area of second notification area 4D, it is unnecessary for a user to input weather information and date information by a touch operation on operation key display area 4A. Therefore, a character string indicating weather information or date information can be input by a simple operation.

A variation will be described below. Description has been made assuming that, in an embodiment, the weather display area and the date display area are displayed as second notification area 4D. On the other hand, when a flick operation or a sliding operation downward in the longitudinal direction is performed on the upper part of the screen in the e-mail input mode in which edit display area 4B and operation key display area 4A are displayed as shown in FIG. 12(A), for example, a clock icon for inputting the time, a camera icon for activating a camera, a GPS icon for inputting position information, and a calendar icon for inputting the date may be displayed in second notification area 4D as shown in FIG. 12(B).

When a tap operation is performed on the clock icon, for example, control module 11 may cause the time setting image to be displayed. When the time is selected in the time setting image, and when a tap operation is performed on the image displaying the character string of "OK", control module 11 can specify the selected time and can cause the specified time to be displayed in edit display area 4B in a predetermined format.

When a tap operation is performed on the camera icon, for example, control module 11 may activate an application program for controlling the camera (referred to as a camera application in the following description). When the camera application is terminated after image capturing, control module 11 can set data on a captured image as an attached file for an e-mail message to be transmitted.

When a tap operation is performed on the GPS icon, for example, control module 11 can obtain position information on the current location of mobile terminal 1, can specify the address based on the obtained position information, and can cause the specified address to be displayed in edit display area 4B in a predetermined format.

When a tap operation is performed on the calendar icon, for example, control module 11 may activate an application program for displaying a calendar (hereinafter referred to as a calendar application). When a further tap operation is performed on the displayed calendar, control module 11 can specify the date corresponding to a touch position, and can cause the specified date to be displayed in edit display area 4B in a predetermined format.

Figure 13:
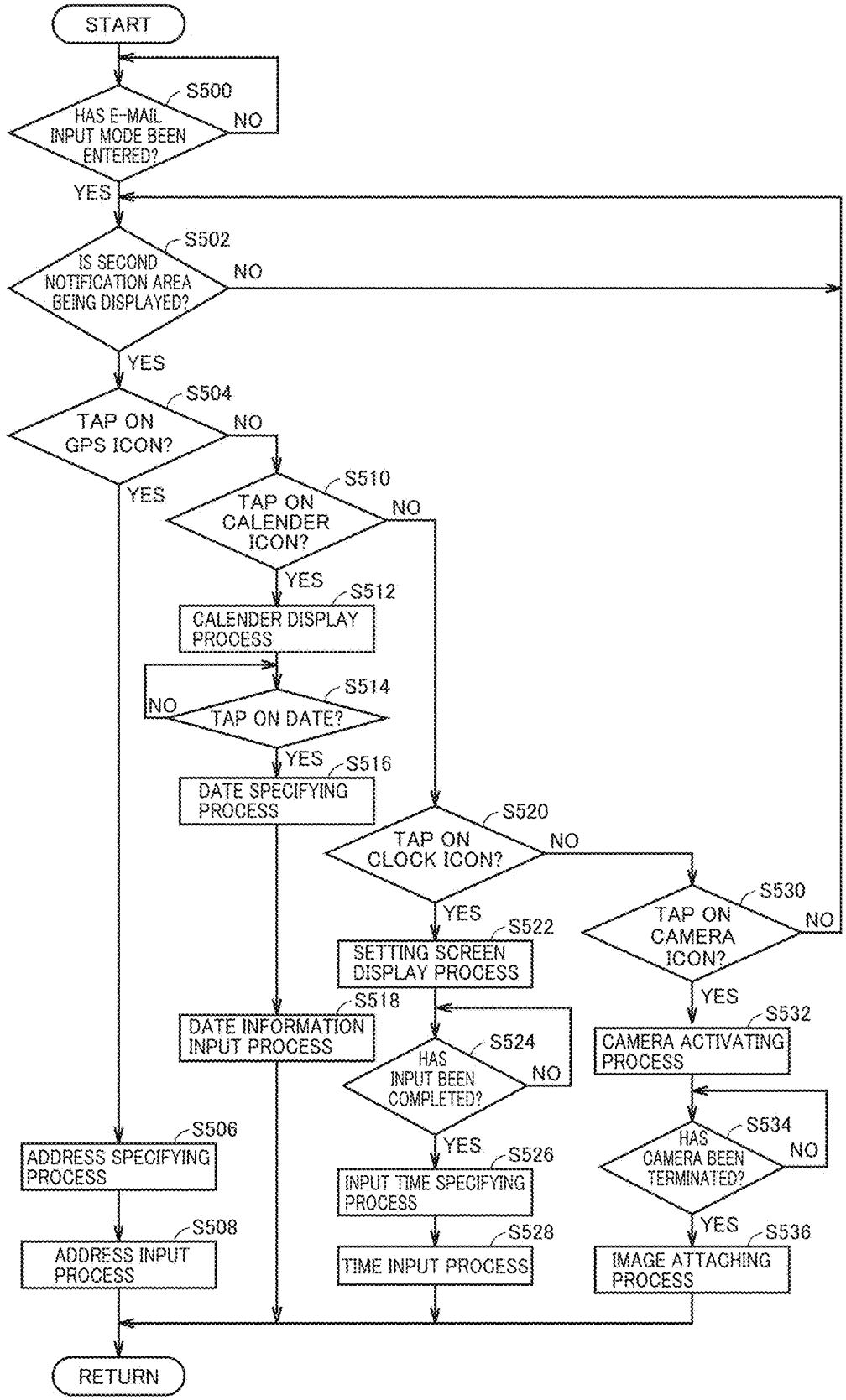
FIG. 13 is a flow chart showing a control process for inputting various types of information by a touch operation on an e-mail icon displayed on the second notification area.
Figure 14:
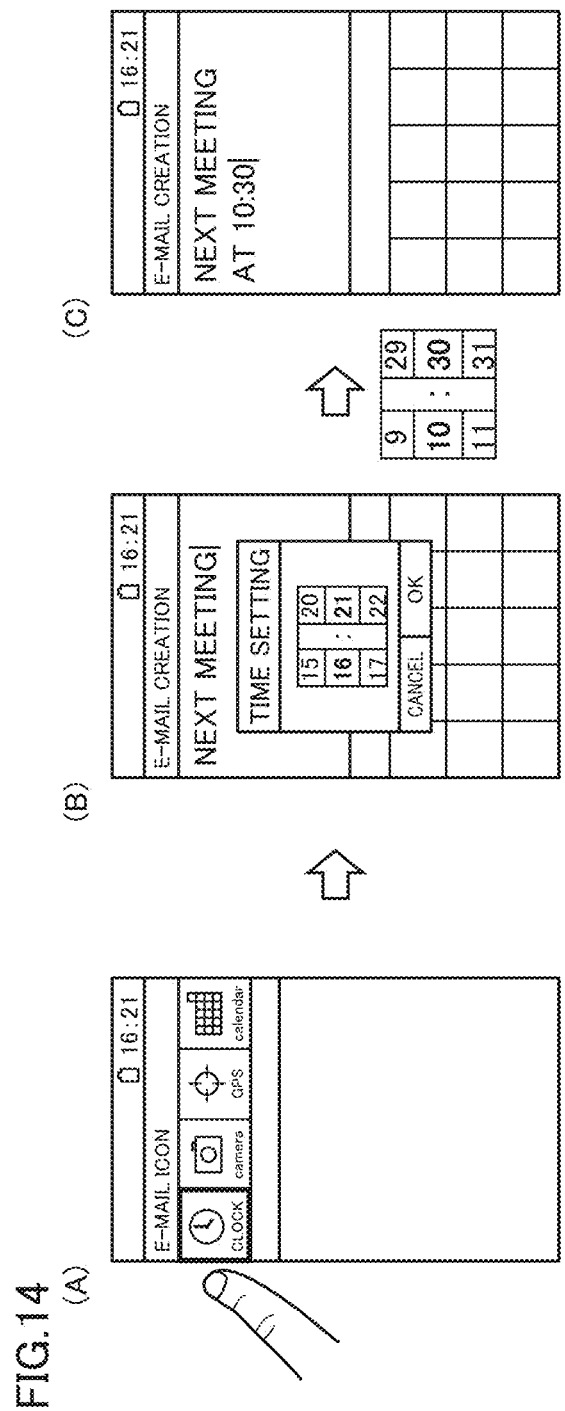
FIG. 14 illustrates an operation for inputting time information by a touch operation on a clock icon.
Figure 15:
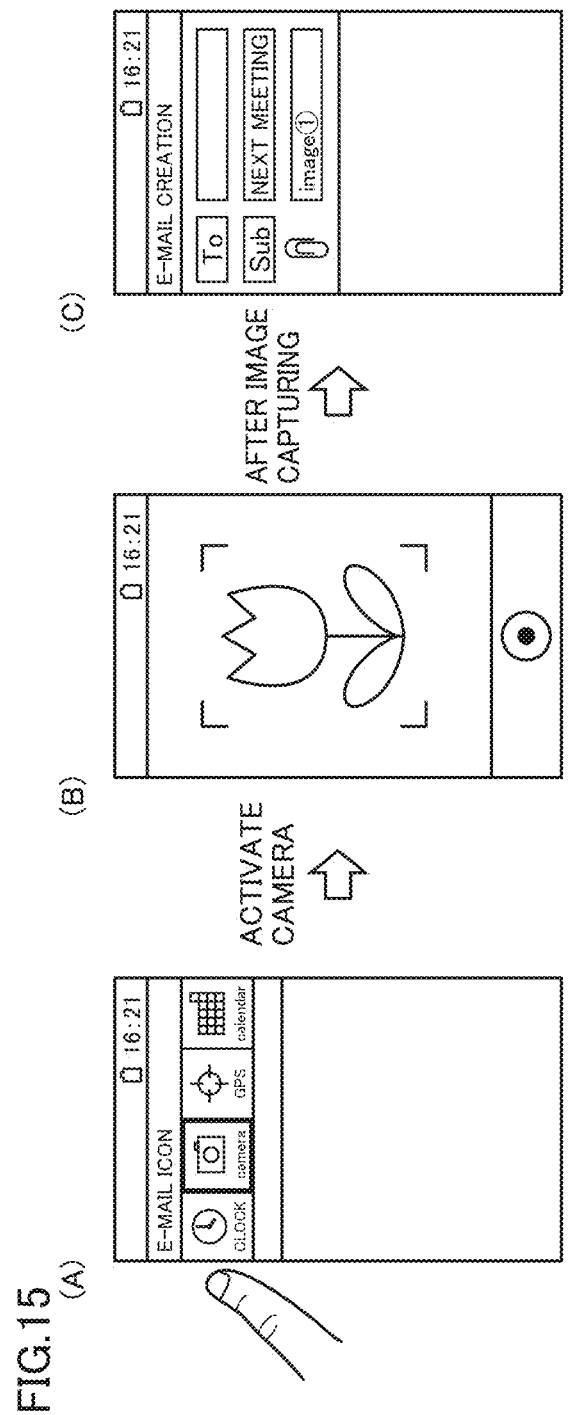
FIG. 15 illustrates an operation for setting data on an image captured after a touch operation on a camera icon as an attached file.

Referring to FIG. 13, an example of a control process for causing text information in accordance with the type of an icon on which a tap operation has been performed to be displayed in the edit display area will be described.

In S500, control module 11 can determine whether or not the e-mail input mode has been entered. When it is determined that the e-mail input mode has been entered (YES in S500), the process proceeds to 502. Otherwise (it is NO at 500), the process is returned to S502.

In S502, control module 11 can determine whether or not second notification area 4D is being displayed. When second notification area 4D is being displayed (YES in S502), the process proceeds to S504. Otherwise (NO in S502), the process is returned to S502.

In S504, control module 11 can determine whether or not a tap operation has been performed on the GPS icon. When it is determined that the tap operation has been performed on the GPS icon (YES in S504), the process proceeds to S506. Otherwise (NO in S504), the process proceeds to S510.

In S506, control module 11 can execute the address specifying process. In S508, control module 11 can execute the address input process. Since the address specifying process and the address input process have been described above, the detailed description thereof will not be repeated.

In S510, control module 11 can determine whether or not a tap operation has been performed on the calendar icon. When it is determined that the tap operation has been performed on the calendar icon (YES in S510), the process proceeds to S512. Otherwise (NO in S510), the process proceeds to S520.

In S512, control module 11 can activate the calendar application to cause a calendar to be displayed on the screen. In S514, control module 11 can determine whether or not a tap operation has been performed on the display position of the date. When it is determined that a tap operation has been performed on the display position of the date (YES in S514), the process proceeds to S516. Otherwise (NO in S514), the process is returned to S514.

In S516, control module 11 can execute the date specifying process. Specifically, control module 11 can specify the date from the tap position. In S518, control module 11 can execute the date information input process. Since the date information input process has been described above, the detailed description thereof will not be repeated.

In S520, control module 11 can determine whether or not a tap operation has been performed on the clock icon. When it is determined that a tap operation has been performed on the clock icon (YES in S520), the process proceeds to S522. Otherwise (NO in S520), the process proceeds to S530.

In S522, control module 11 can execute the setting screen display process. Since the setting screen display process has been described above, the detailed description thereof will not be repeated.

In S524, control module 11 can determine whether or not input of the time has been completed. When it is determined that input of the time has been completed (YES in S524), the process proceeds to S526. Otherwise (NO in S524), the process is returned to S524.

In S526, control module 11 can execute the input time specifying process. In S528, control module 11 can execute the time input process. Since the input time specifying process and the time input process have been described above, the detailed description thereof will not be repeated.

In S530, control module 11 can determine whether or not a tap operation has been performed on the camera icon. When it is determined that a tap operation has been performed on the camera icon (YES in S530), the process proceeds to S532. Otherwise (NO in S530), the process is returned to S502.

In S532, control module 11 can execute the camera activating process. Specifically, control module 11 can activate the camera application to control camera 7 to be brought into a state capable of capturing an image.

In S534, control module 11 can determine whether or not the camera application has been terminated. For example, when a user operation for terminating the camera application has been performed, control module 11 can determine that the camera application has been terminated. When it is determined that the camera application has been terminated (YES in S534), the process proceeds to S536. Otherwise (NO in S534), the process is returned to S534.

In S536, control module 11 can execute an image attaching process. Specifically, when there is an image captured after the camera activating process, control module 11 can set the captured image as an attached file for an e-mail message to be transmitted being created.

Operations of control module 11 based on the control process shown in the flow chart as described above will be described with reference to FIGS. 14 to 17.

For example, assume the case in which, in the e-mail input mode (YES in S500), a user performs a flick operation or the like on the upper part of the screen to bring a notification area into a displayed state (YES in S502).

Under such a situation, when a tap operation has been performed on the clock icon as shown in FIG. 14(A) (NO in S504, NO in S510 and YES in S520), a setting screen display process can be executed (S520). Therefore, the time setting image can be displayed as shown in FIG. 14(B). When a user selects "10:30" as the time and performs a tap operation on the image including the character string of "OK", "10:30" is displayed in edit display area 4B as text information as shown in FIG. 14(C).

Alternatively, when a tap operation has been performed on the camera icon under the above-described situation as shown in FIG. 15(A) (NO in S504, NO in S510 and YES in S530), the camera activating process can be executed (S530). Accordingly, the camera application can be activated as shown in FIG. 15(B). When a user terminates the camera application after image capturing through use of the camera application (YES in S532), the image attaching process can be executed (S534). Accordingly, the captured image can be set as an attached file for the e-mail message to be transmitted being created, as shown in FIG. 15(C).

Alternatively, when a tap operation has been performed on the GPS icon under the above-described situation as shown in FIG. 16(A) (YES in S504), the address specifying process and the address input process can be executed (S506 and S508). Accordingly, the address of the current location can be displayed in edit display area 4B as text information in a predetermined format, as shown in FIG. 16(B).

Alternatively, when a tap operation has been performed on the calendar icon under the above-described situation as shown in FIG. 17(A) (NO in S504 and YES in S510), the calendar display process can be executed (S512). As shown in FIG. 17(B), when a user has performed a tap operation on the date display position (YES in S514), the date specifying process and the date information input process can be executed (S516 and S518). Accordingly, the specified date "Saturday, January 18" can be displayed in edit display area 4B as text information, as shown in FIG. 17(C).

In this way, a character string can also be input by a simpler operation than when performing a touch operation on operation key display area 4A to cause information to be displayed in edit display area 4B as text information.

The method for inputting text information in the e-mail input mode according to an embodiment has been described. A similar input method may also be used for an application other than the e-mail application (e.g., a text editor) to enable text information to be input.

Another variation will be described below. Description has been made that, in an embodiment, when a user performs a tap operation on the detected state display area of first notification area 4C in the e-mail input mode, the address of the current location including link information with the map application can be displayed in edit display area 4B as text information as shown in FIGS. 7 and 8, but this is not a limitative example. For example, if a user performs a tap operation on the detected state display area of first notification area 4C in the e-mail input mode, a map image relevant to the current location may be displayed in edit display area 4B as an image to be pasted in the message body, or data including the map image may be set as an attached file. The map image relevant to the current location may be, for example, an image including a map of a region within a predetermined distance from the current location and a symbol (e.g., an arrow or a mark) with which the current location can be specified on the map, or may be an image including a map of the surroundings alone.

Description has also been made that, in an embodiment, when a tap operation is performed on a specific area of first notification area 4C or second notification area 4D in the e-mail input mode, text information corresponding to the specific area can be displayed in edit display area 4B. On the other hand, when a tap operation is performed particularly on a display area different from first notification area 4C and second notification area 4D, text information corresponding to the touch position may be displayed in edit display area 4B.

The display area different from first notification area 4C and second notification area 4D can refer to, for example, a display area of one or more gadgets displayed on the home screen displayed when a user performs a predetermined operation (e.g., a pressing operation on a home button or a tap operation on a home button image displayed in the screen) in the e-mail input mode. For example, in the case where a user performs a predetermined operation in the e-mail input mode to switch the screen to the home screen, and in the case where a gadget displaying a timetable of trains has been activated on the home screen, when a user performs a tap operation on a display area in which the timetable is displayed, information on the display area of the gadget (e.g., information on the timetable) may be added to an e-mail message to be transmitted being created as text information to be displayed in edit display area 4B, as image information to be displayed in edit display area 4B, or as an attached file.

Although an embodiment of the present disclosure has been described, it should be understood that the embodiment disclosed herein is illustrative and non-restrictive in every respect. The scope of the present disclosure is defined by the claims, and is intended to include any modification within the meaning and scope equivalent to the terms of the claims.

What is claimed is:

1. A mobile terminal comprising:
   a touch panel display configured to display information and accept a touch operation by a user; and
   at least one processor configured to
      display first information in a notification area on the touch panel display, and,
      in an input mode for inputting text information into a text input area that is distinct from the notification area,
         in response to a first touch operation, expand the notification area over the text input area, and display second information in the expanded notification area,
         when a second touch operation is performed to select at least a portion of the second information in the expanded notification area, insert third information, related to the selected at least a portion of the second information, into the text input area, and contract the expanded notification area,
      wherein the at least one processor simultaneously displays the contracted notification area, the text input area, and a virtual keyboard for inputting characters into the text input area.

2. The mobile terminal according to claim 1, wherein the at least a portion of the second information comprises time information, and wherein the third information comprises formatted time information.

3. The mobile terminal according to claim 1, further comprising a detection device configured to detect a current location of the mobile terminal, wherein the at least a portion of the second information comprises a location indicator, and wherein the third information comprises an address corresponding to the current location of the mobile terminal.

4. The mobile terminal according to claim 1, wherein the at least a portion of the second information comprises first weather information, and wherein the third information comprises formatted second weather information derived from the first weather information.

5. The mobile terminal according to claim 1, wherein the second information comprises a plurality of dates in a predetermined period, and wherein the third information comprises a date selected from the plurality of dates by the second touch operation.

6. A method for controlling a mobile terminal including a touch panel display configured to display information and accept a touch operation by a user, the method comprising:
   displaying first information in a notification area on the touch panel display; and,
   in an input mode for inputting text information into a text input area that is distinct from the notification area,
      in response to a first touch operation, expanding the notification area over the text input area, and displaying second information in the expanded notification area,
      when a second touch operation is performed to select at least a portion of the second information in the expanded notification area, inserting third information, related to the selected at least a portion of the second information, into the text input area, and contracting the expanded notification area,
   wherein the contracted notification area, the text input area, and a virtual keyboard for inputting characters into the text input area are simultaneously displayed.

7. The mobile terminal according to claim 3, wherein the address in the third information comprises a link that, when selected, activates an application for displaying a map corresponding to the address.

8. The mobile terminal according to claim 3, wherein the third information further comprises a map image corresponding to the address.

9. The mobile terminal according to claim 2, wherein the first information comprises an hour value and a minute value, wherein the formatted time information comprises an hour value and a minute value, and wherein the second information comprises one or more inputs for changing the hour value and the minute value to be used in the formatted time information from the hour value and the minute value displayed as the first information.

10. The mobile terminal according to claim 5, wherein the predetermined period is one month, and wherein the plurality of dates are arranged in a calendar format representing the one month.

\* \* \* \* \*